United States Patent [19]

Sato et al.

[11] 3,920,594

[45] Nov. 18, 1975

[54] RESIN COMPOSITION FOR LAMINATES

[75] Inventors: Shunichi Sato; Masaharu Kurata; Mineaki Tanigaichi; Fumiki Iguchi; Kazuyoshi Iwasawa, all of Tokyo, Japan

[73] Assignee: Mitsubishi Gas Chemical Company, Inc., Tokyo, Japan

[22] Filed: July 2, 1974

[21] Appl. No.: 485,228

[30] Foreign Application Priority Data
July 4, 1973 Japan.............................. 48-75408

[52] U.S. Cl.......... 260/19 R; 260/19 EP; 260/19 N; 260/838; 260/DIG. 24
[51] Int. Cl.$^2$.......................................... C08G 8/32
[58] Field of Search..... 260/19 N, 19 R, 838, 19 EP

[56] References Cited
UNITED STATES PATENTS

| | | | |
|---|---|---|---|
| 2,321,783 | 6/1943 | Webber | 260/838 |
| 2,351,716 | 6/1944 | Smith | 260/838 |
| 3,741,920 | 6/1973 | Weissenfels | 260/19 N |

*Primary Examiner*—Ronald W. Griffin
*Attorney, Agent, or Firm*—Armstrong, Nikaido & Wegner

[57] ABSTRACT

A resin composition for laminates excellent in water resistance, heat resistance, electrical properties, flame resistance, mechanical strength and punchability is obtained by blending a composition comprising a drying oil-modified resol type phenolic resin and a resol type water-soluble phenolic resin, which have heretofore been conventionally used as resins for laminates, with an amine-modified resol type phenolic resin and a halogenated epoxy-drying oil-modified resol type phenolic resin, and if necessary with a flame retardant.

12 Claims, No Drawings

RESIN COMPOSITION FOR LAMINATES

This invention relates to a novel resin composition for laminates. More particularly, the invention pertains to a resin composition for laminates excellent in flame resistance and mechanical strength which is obtained by blending a composition comprising a drying oil-modified resol type phenolic resin and a resol type water-soluble phenolic resin, which have heretofore been conventionally used as resins for laminates, with an amine-modified phenolic resin and a haloganated epoxy-drying oil-modified resol type phenolic resin.

Hitherto, phenolic resin varnishes have conventionally been used for the production of laminates by impregnating a base material such as cellulose fibers, glass fibers or the like with said varnishes. Various properties such as water resistance, heat resistance and electrical properties which the resins per se have are utilized, but the laminates are not always satisfactory in properties when used in some fields.

With an aim to improve the properties of laminates produced by use of such phenolic resins, there have been proposed processes in which the phenolic resins are variously modified or mixed with melamine or other resins, or base materials are previously impregnated with phenolic resins having a low degree of condensation or with other resins. With a recent increase in demand for laminates, however, more excellent properties which cannot be attained by the aforesaid processes have come to be required, and it is the actual state that glass fibers, asbestos fibers or synthetic fibers are used as base materials or special resins are used for the production of laminates having more excellent properties to cause such disadvantage that the laminates cannot but become extremely high in cost.

At present, industrial laminates are not only required to be excellent in water resistance, electrical properties and punchability but also strongly demanded to be high in flame resistance, heat resistance and mechanical strength. The present invention is concerned with a resin composition for the production of laminates capable of satisfying the above-mentioned requirements.

An object of this invention is to provide a resin composition for producing laminates excellent in water resistance, electrical properties, punchability, flame resistance, heat resistance and mechanical strength.

Another object of this invention is to provide a resin composition comprising an amine-modified resol type phenolic resin and a halogenated epoxy-drying oil-modified resol type phenolic resin in combination with a drying oil-modified resol type phenolic resin and a resol type water-soluble phenolic resin.

A further object of this invention is to provide a resin composition comprising the above-mentioned resin composition and a small amount of a flame retardant.

A still further object of this invention is to provide a laminate excellent in water resistance, electric insulation, and mechanical strength such as flexural strength and impact resistance, and showing solder heat resistance, flame resistance and self-extinguishing property in an extremely high degree, specifically the 94 V-O level regulated in the UL-specification.

In accordance with the present invention, there is provided a resin composition for laminates, comprising (1) 20 to 60 % by weight of at least one amine-modified resol type phenolic resin, (2) 10 to 60 % by weight of at least one halogenated epoxy-drying oil-modified resol type phenolic resin, (3) 15 to 55 % by weight of a drying oil-modified resol type phenolic resin, and (4) 5 to 20 % by weight of a resol type water-soluble phenolic resin.

The present resin composition for laminates is concretely explained in detail below.

The resin composition of the present invention may be prepared by blending, based on the weight of the resin composition, 20 to 60 % by weight, preferably 20 to 50 % by weight, of the amine-modified resol type phenolic resin, 10 to 60 % by weight, preferably 15 to 50 % by weight, of the halogenated epoxy-drying oil-modified resol type phenolic resin, 15 to 55 % by weight, preferably 20 to 40 % by weight, of the drying oil-modified resol type phenolic resin, and 5 to 20 % by weight, preferably 7 to 15 % by weight, of the resol type water-soluble phenolic resin. Ordinarily, these constituent resins are prepared in the form of varnishes, and the thus prepared varnishes are mixed with each other so as to satisfy the above-mentioned proportions.

The present inventors have produced a laminate by blending the above-mentioned halogenated epoxy-drying oil-modified resol type phenolic resin alone with a composition comprising a drying oil-modified resol type phenolic resin and resol type water soluble phenolic resin and found that the laminate is sufficiently high in flame resistance and also excellent in flexibility, but is still not satisfactory in electrical properties and solder heat resistance as a high quality laminate. The inventors have further found that a high quality laminate can be obtained by using the resin composition of the present invention, i.e., a resin composition comprising an amine-modified resol type phenolic resin and a halogenated epoxy-drying oil-modified resol type phenolic resin in combination with a conventional resin composition for laminates. That is, the present inventors have found that a laminate obtained by impregnating a base material with a varnish of the present resin composition and then laminating the thus impregnated base material, is not only excellent in water resistance and electric insulation but also high in mechanical strengths, such as flexural strength, impact resistance and the like, thus in punchability, and is also excellent in solder heat resistance. The inventors have further found that even when the resin composition of the present invention is used as it is, there is obtained a laminate sufficiently high in flame resistance, and if the composition is blended with a small amount of a flame retardant, it is possible to obtain a laminate having a self-extinguishing property in an extremely high degree, specifically the 94 V-O level regulated in the UL-specification. The incorporation of a slight amount of a flame retardant brings about substantially no such drawbacks as degradation in mechanical strength of the laminate and delamination, and does not require the use of an antimony compound as a flame retardant.

The amine-modified resol type phenolic resin used in the resin composition of the present invention is prepared, for example, in the following manner:

At least one amine, representatives of which are urea, melamine, acetoguanamine, benzoguanamine, acetanilide, benzenesulfonamide and toluenesulfonamide, is mixed with formalin or paraformaldehyde in an amount corresponding to 1.0 to 8 moles of formaldehyde per mole of said amine. The resulting mixture is adjusted to a pH of 9 to 10 by adding as a catalyst a basic compound such as an alkali metal or alkaline earth metal hydroxide or carbonate, charged with water, if necessary, and then reacted at 50° to 100°C for 10 to 180 minutes to obtain a reaction product. This product is mixed with 0.5 to 1.5 moles, per mole of said amines of a phenol; or an alkylphenol such as cresol or xylenol and if necessary, incorporated with formaldehyde and with the above-mentioned catalyst to maintain the said pH, and then reacted at 80° to 100°C for 60 to 180 minutes to obtain a resinous product. If necessary, this resinous product may be mixed with at least one of the aforesaid amines and reacted in the presence or absence of formaldehyde. The thus obtained resin is the amine-modified resol type phenolic resin referred to herein. Conventionally, the said resin is used in the form of a varnish obtained by adding to the above-mentioned reaction liquid at least one water-miscible solvent such as methanol, acetone, methyl ethyl ketone, ethylene glycol monomethyl ether, or the like.

Examples of the thus obtained amine-modified resol type phenolic resin include melamine-modified resol type phenol resin, benzoguanamine-modified resol type phenol resin, acetoguanamine-modified resol type phenol resin, benzenesulfonamide-modified resol type phenol resin, toluenesulfonamide-modified resol type phenol resin, melamine-benzenesulfonamide-modified resol type phenol resin, melamine-toluenesulfonamide-modified resol type phenol resin and melamine-modified resol type xylenol resin. These may be used alone or in admixture of two or more.

The halogenated epoxy-drying oil-modified resol type phenolic resin used in the resin composition of the present invention is a novel resol type resin and is prepared in the following manner:

At least one phenol, e.g., phenol; an alkyl-phenol such as cresol or xylenol; an arylphenol such as phenylphenol or cumylphenol; or a polyhydric phenol such as bisphenol A is mixed with 20 to 100 parts by weight, per mole of the phenol, of a drying oil such as linseed oil, tung oil, dehydrated castor oil, oiticica oil, safflower oil or soybean oil, and with 0.002 to 0.2 mole, per mole of said phenol, of at least one catalyst, e.g. an organosulfonic acid such as toluenesulfonic or benzenesulfonic acid; an organosulfonic acid chloride such as toluenesulfonic acid chliride, an organic acid such as formic or oxalic acid, a mineral acid such as phosphoric, hydrochloric or sulfuric acid; or a metal chloride such as tin or zinc chloride. The resulting mixture is reacted at 100° to 300°C for 30 to 180 minutes to obtain a resinous drying oil-modified phenol. After cooling, the drying oil-modified phenol is mixed with formalin or paraformaldehyde in an amount corresponding to 0.6 to 2.0 moles of formaldehyde per mole of said phenol and with 20 to 100 parts by weight of a halogenated aryl glycidyl ether per mole of said phenol. The resulting mixture is reacted at 90° to 100°C for 60 to 180 minutes in the presence of 0.001 to 0.02 mole of a catalyst selected from amines such as ammonia, hexamethylenetetramine, trimethylolamine and ethylenediamine, and then subjected to dehydration under reduced pressure to obtain a resin. The thus obtained resin is the halogenated epoxy-drying oil-modified resol type phenolic resin referred to herein. Conventionally the said resin is used in the form of a varnish in at least one solvent selected from methanol, acetone, methyl ethyl ketone, ethylene glycol monomethyl ether, benzene, toluene and xylene. The above-mentioned halogenated aryl glycidyl ether includes, for example, nucleus-halogenated aryl monoglycidyl ethers such as mono-, di- or tri-bromophenyl glycidyl ether, mono- or di-bromocresyl glycidyl ether, or dichlorophenyl or dichlorocresyl glycidyl ether.

Examples of the thus obtained halogenated epoxy-drying oil-modified resol type phenolic resin include dibromocresyl glycidyl ether-tung oil-modified resol type phenol resins, dibromophenyl glycidyl ether-tung oil-modified resol type phenol resins, dibromocresyl glycidyl ether-linseed oil-modified resol type phenol resins, dibromocresyl glycidyl ether-tung oil-modified resol type alkylphenol resins, dibromocresyl glycidyl ether-linseed oil-modified resol type alkyphenol resins and dibromocresyl glycidyl ehter-tung oil-modified resol type arylphenol resins. These may be used alone or in admixture of two or more.

The aforesaid drying oil-modified resol type phenolic resin and resol type water-soluble phenolic resin, which are the other constituents of the resin composition of the present invention, are known resol type resins and may be any of those obtained by conventional processes.

The flame retardant, which is incorporated into the present resin composition in order to make the resulting laminate flame resistant, includes organic halides and organic phosphates. Preferable examples of the organic halides are halogenated phenols and halogenated epoxy resins such as mono-, di- and tri-bromophenols, trichlorophenol, tetrabromobisphenol A and tetrachlorobisphenol A, and preferable examples of the organic phosphates are phosphorous esters such as tributyl phosphite, tridecyl phosphite, triphenyl phosphite and tricresyl phosphite; phosphates such as tributyl phosphate, trioleyl phosphate, dioctyl phosphate and tricresyl phosphate; and halogen-containing phosphates such as tris (2,3-dibromopropyl) phosphate. The amount of the flame retardant is less than 7 % by weight, preferably 1 to 5 % by weight, based on the weight of the resin composition.

For the production of a laminate by use of the resin composition of the present invention, a conventional process may be adopted as it is. For example, a varnish obtained by dissolving the present resin composition in a solvent is used to impregnate a base material which may be any of synthetic and natural fabrics and papers such as glass fabrics, glass mats, glass papers, glass-cellulose papers, cellulosic papers or cotton linters. Subsequently, the thus impregnated base is dried and then formed into prepregs, and a required number of said prepregs are put on one another, and if necessary, a metal foil or foils such as copper, nickel or alminium foil may also be placed on the resulting assembly. The thus formed assembly is pressed at a temperature of 130° to 180°C and a pressure of 80 to 200 kg/cm$^2$, whereby a desired laminate can be obtained.

The present invention is explained in more detail below with reference to Examples, which are merely by way of illustration and not by way of limitation. In the Examples, all parts and percentages are by weight, unless otherwise specified.

1. Preparation of amine-modified resol type phenolic resin varnishes:

EXAMPLE 1

A mixture of 100 parts of melamine, 350 parts of 37 % formalin and 80 parts of water was adjusted to a pH of 9 by addition of sodium hydroxide, and then heated with stirring until the mixture became transparent to obtain a resinous product. After cooling, the resinous product was mixed with 90 parts of phenol and reacted at 90°C for 1 hour, and further mixed with 130 parts of benzenesulfonamide and reacted at 80°C for 30 minutes. Subsequently, the reaction product was mixed with 60 parts of paraformaldehyde and 200 parts of acetone, and then reacted at 65°C for 1 hour to obtain a benzenesulfonamide-melamine-modified resol type phenol resin varnish having a non-volatile content of 50 %.

EXAMPLE 2

A mixture of 220 parts of benzoguanamine and 300 parts of 37 % formalin was adjusted to a pH of 9 by addition of aqueous sodium hydroxide, and then reacted with stirring at 90°C for 1 hour to obtain a resinous product. After cooling, the resinous product was mixed with 100 parts of phenol and further reacted at 90°C for 1 hour. Subsequently, the reaction product was mixed with acetone to obtain a benzoguanamine-modified resol type phenol resin varnish having a non-volatile content of 55 %.

2. Preparation of halogenated epoxy-drying oil-modified resol type phenolic resin varnishes:

EXAMPLE 3

A mixture of 900 parts of phenol, 400 parts of tung oil and 9 parts of 85 % phosphoric acid was reacted at 130°C for 3 hours to obtain resinous product. After cooling to 90°C, the resinous product was mixed with 800 parts of 37 % formalin, 500 parts of dibromocresyl glycidyl ether and 14 parts of hexamethylenetetramine, and heated at 95°C for 2 hours. Subsequently, the reaction product was subjected to dehydration under reduced pressure, and then mixed with acetone to obtain a dibromocresyl glycidyl ether-tung oil-modified resol type phenol resin varnish having a non-volatile content of 60 %.

EXAMPLE 4

The same procedure as in Example 3 was repeated, except that the dibromocresyl glycidyl ether was replaced by dibromophenyl glycidyl ether, to prepare a dibromophenyl glycidyl ether-tung oil-modified resol type phenol resin varnish having a non-volatile content of 60 %.

EXAMPLE 5

A mixture of 600 parts of m-cresol (composed of 60 % of meta-cresol and 40 % of para-cresol), 300 parts of tung oil and 6 parts of 85 % phosphoric acid was reacted at 120°C for 3 hours to obtain resinous product. After cooling to 90°C, the resinous product was mixed with 550 parts of 37 % formalin, 400 part of dibromocresyl glycidyl ether and 7 parts of hexamethyelenetetramine, and reacted at 90°C for 2 hours. Subsequently, the reaction product was subjected to dehydration under reduced pressure and then mixed with acetone to obtain a dibromocresyl glycidyl ether-tung oil-modified resol type m-cresol resin varnish having a non-volatile content of 60 %.

EXAMPLE 6

A mixture of 900 parts of phenol, 400 parts of linseed oil and 5 parts of 95 % sulfuric acid was reacted at 160°C for 4 hours to obtain a resinous product. After cooling to 90°C, the resinous product was mixed with 800 parts of 37 % formalin, 500 parts of dibromocresyl glycidyl ether and 14 parts of hexamethylenetetremine, and reacted at 90°C for 2 hours. Subsequently, the reaction product was subjected to dehydration under reduced pressure, and then mixed with acetone to obtain a dibromocresyl glycidyl ether-linseed oil-modified resol type phenol resin varnish having a non-volatile content of 60 %.

EXAMPLE 7

A mixture of 650 parts of xylenol (composed of 70 % of 3,5-xylenol and 30 % of 2,4-xylenol), 280 parts of linseed oil and 5 parts of 95 % sulfuric acid was reacted at 160°C for 4 hours to obtain a resinous product. After cooling, the resinous product was mixed with 500 parts of 37 % formalin, 400 parts of dibromophenyl glycidyl ether and 8 parts of ethylenediamine, and reacted at 90°C for 3 hours. Subsequently, the reaction product was subjected to dehydration under reduced pressure and then mixed with acetone to prepare a dibromophenyl glycidyl ether-linseed oil-modified resol type xylenol resin varnish having a non-volatile content of 60 %.

3. Preparation of drying oil-modified resol type phenolic resin varnishes:

EXAMPLE 8

A mixture of 500 parts of phenol, 220 parts of tung oil and 6 parts of 85 % phosphoric acid was reacted at 120°C for 3 hours to obtain a resinous product. After cooling to 90°C, the resinous product was mixed with 500 parts of 37 % formalin and 5 parts of hexamethylenetetramine, and reacted at 90°C for 2 hours. The reaction product was subjected to dehydration under reduced pressure, and then mixed with a methanol-xylene mixed solvent to obtain a tung oil-modified resol type phenol resin varnish having a non-volatile content of 60 %.

EXAMPLE 9

The same procedure as in Example 8 was repeated, except that the tung oil was replaced by dehydrated castor oil, to prepare a dehydrated castor oil-modified resol type phenol resin varnish.

4. Preparation of resol type water-soluble phenolic resin varnish:

EXAMPLE 10

A mixture of 350 parts of phenol and 700 parts of 37 % formalin was reacted at 50°C for 7 hours in the presence of 6 parts of magnesium hydroxide to obtain a resinous product. The resinous product was mixed with methanol to obtain a resol type water-soluble phenol resin varnish having a non-volatile content of 60 %.

EXAMPLE 11

The varnishes obtained in Examples 1 to 6, 8 and 10 were blended in such proportions as shown in Table 1 to prepare a varnish for impregnation of a base material. A 100 % cotton linter paper was impregnated with the thus prepared varnish, and then dried to obtain a prepreg having a resin content of 47 %. Required sheets of this prepreg were put on one another, and a copper foil coated with an adhesive was laid on the resulting assembly. Subsequently, the assembly was pressed for 80 minutes at a temperature of 165°C under a pressure of 100 kg/cm$^2$ to obtain a copperclad laminate having a thickness of 1.6 mm. Properties of the laminate were as set forth in Table 2. When the varnishes obtained in Examples 7 and 9 were used, similar results were obtained.

Table 1

| Blended resins | Resin composition | | A | B | C |
|---|---|---|---|---|---|
| (1) | Amine-modified resol type phenolic resins (parts) | Example 1 | 53 | 70 | 25 |
| | | Example 2 | — | — | — |
| (2) | Halogenated epoxy-drying oil-modified resol type phenolic resins (parts) | Example 3 | 60 | 70 | 45 |
| | | Example 4 | — | — | — |
| | | Example 5 | — | — | — |
| | | Example 6 | — | — | — |
| (3) | Drying oil-modified resol type phenolic resin (parts) | Example 8 | 50 | 30 | 20 |
| (4) | Water-soluble resol type phenolic resin (parts) | Example 10 | 20 | 30 | 10 |
| | Flame retardant (parts) | | Tetrabromobisphenol A: 5 Halogenated epoxy resin (Note 1): 4 | Halogenated epoxy resin (Note 1): 3 | Same as left (Note 1): 2 |

| Blended resins | Resin composition | | D | E | F |
|---|---|---|---|---|---|
| (1) | Amine-modified resol type phenolic resins (parts) | Example 1 | 70 | 50 | — |
| | | Example 2 | — | — | 53 |
| (2) | Halogenated epoxy-drying oil-modified resol type phenolic resins (parts) | Example 3 | 30 | 20 | — |
| | | Example 4 | — | — | 60 |
| | | Example 5 | — | — | — |
| | | Example 6 | — | — | — |
| (3) | Drying oil-modified resol type phenolic resin (parts) | Example 8 | 70 | 20 | 50 |
| (4) | Water-soluble resol type phenolic resin (parts) | Example 10 | 30 | 10 | 20 |
| | Flame retardant (parts) | | Tris(2,3-dibromopropyl) phosphate: 3 | Halogenated epoxy resin (Note 1): 4 | Tetrabromobisphenol A: 5 Halogenated epoxy resin: 4 |

| Blended resins | Resin composition | | G | H | I |
|---|---|---|---|---|---|
| (1) | Amine-modified resol type phenolic resins (parts) | Example 1 | — | — | — |
| | | Example 2 | 53 | 53 | 53 |
| (2) | Halogenated epoxy-drying oil-modified resol type phenolic resins (parts) | Example 3 | — | — | 60 |
| | | Example 4 | — | — | — |
| | | Example 5 | 60 | — | — |
| | | Example 6 | — | 60 | — |
| (3) | Drying oil-modified resol type phenolic resin (parts) | Example 8 | 50 | 50 | 50 |
| (4) | Water-soluble resol type phenolic resin (parts) | Example 10 | 20 | 20 | 20 |
| | Flame retardant (parts) | | Same as left | Same as left | Same as left |

| Blended resins | Resin composition | | J | K | L |
|---|---|---|---|---|---|
| (1) | Amine-modified resol type phenolic resins (parts) | Example 1 | — | 70 | 70 |
| | | Example 2 | 53 | — | — |
| (2) | Halogenated epoxy-drying oil-modified resol type phenolic resins (parts) | Example 3 | — | — | — |
| | | Example 4 | — | 70 | — |
| | | Example 5 | 60 | — | 70 |
| | | Example 6 | — | — | — |
| (3) | Drying oil-modified resol type phenolic | Example 8 | 50 | 30 | 30 |

Table 1-continued

| Blended resins | Resin composition | | A | B | C | |
|---|---|---|---|---|---|---|
| (4) | Water-soluble resol type phenolic resin (parts) | Example 10 | 20 | 30 | 30 | |
| | Flame retardant (parts) | | Same as left | Halogenated epoxy resin: 3 | Same as left | |

| Blended resins | Resin composition | | M | N | O | P |
|---|---|---|---|---|---|---|
| (1) | Amine-modified resol type phenolic resins (parts) | Example 1 | 70 | 70 | — | — |
| | | Example 2 | — | — | 70 | 25 |
| (2) | Halogenated epoxy- drying oil-modified resol type phenolic resins (parts) | Example 3 | — | 70 | 70 | 45 |
| | | Example 4 | — | — | — | — |
| | | Example 5 | — | — | — | — |
| | | Example 6 | 70 | — | — | — |
| (3) | Drying oil-modified resol type phenolic resin (parts) | Example 8 | 30 | 30 | 30 | 20 |
| (4) | Water-soluble resol type phenolic resin (parts) | Example 10 | 30 | 30 | 30 | 10 |
| | Flame retardant (parts) | | Same as left | None | None | Halogenated epoxy resin (Note 1): 2 |

Note 1: "DER-542" produced by Dow Chemical Co.

Table 2

| Test item | Standards | Treating conditions | A | B |
|---|---|---|---|---|
| Water absorption (%) | JIS K-6911 (1970) | E-24/50 + D-24/23 | 0.59 | 0.72 |
| Insulation resistance (Ω) | JIS K-6911 (1970) | C-90/20/65 | $1.5 \times 10^{13}$ | $9.8 \times 10^{12}$ |
| | | C-90/20/65 + D-2/100 | $8.0 \times 10^8$ | $4.5 \times 10^8$ |
| Punchability | ASTM D-617 | A | 30 – 80°C Very good | 40 – 80°C Good |
| Flame resistance | UL specification | Solid burning class | 94 V-O | 94 V-O |
| Solder float 260°C (sec.) | National Electric Manufactures Association | A | 40 – 42 | 32 – 34 |
| Hot wire ignition (sec.) | UL specification | A | 300+ | 300+ |
| High voltage arc resistance (sec.) | Ul specification | A | 120+ | 120+ |
| Flexural strength (kg.mm²) | JIS K-6911 (1970) | A | 19.6 | 16.8 |

| Test item | Standards | Treating conditions | C | D |
|---|---|---|---|---|
| Water absorption (%) | JIS K-6911 (1970) | E-24/50 + D-24/23 | 0.63 | 0.82 |
| Insulation resistance (Ω) | JIS K-6911 (1970) | C-90/20/65 | $3.1 \times 10^{13}$ | $4.8 \times 10^{12}$ |
| | | C-90/20/65 + D-2/100 | $9.9 \times 10^8$ | $3.4 \times 10^8$ |
| Punchability | ASTM D-617 | A | 30 – 80°C Very good | 60 – 90°C Good |
| Flame resistance | UL specification | Solid burning class | 94 V-0 | 94 V-1 |
| Solder float 260°C (sec.) | National Electric Manufactures Association | A | 42 – 44 | 27 – 29 |
| Hot wire ignition (sec.) | UL specification | A | 300+ | 300+ |
| High voltage arc resistance (sec.) | UL specification | A | 120+ | 120+ |
| Flexural strength (kg.mm²) | JIS K-6911 (1970) | A | 18.1 | 16.8 |

| Test item | Standards | Treating conditions | E | F |
|---|---|---|---|---|
| Water absorption (%) | JIS K-6911 (1970) | E-24/50 + D-24/23 | 0.51 | 0.63 |
| Insulation resistance (Ω) | JIS K-6911 (1970) | C-90/20/65 | $1.8 \times 10^{13}$ | $2.4 \times 10^{13}$ |
| | | C-90/20/65 + D-2/100 | $7.1 \times 10^8$ | $2.4 \times 10^8$ |
| Punchability | ASTM D-617 | A | 50 – 80°C Verg good | 30 – 80°C Very good |
| Flame resistance | UL specification | Solid burning class | 94 V-0 | 94 V-0 |
| Solder float 260°C (sec.) | National Electric Manufactures Association | A | 48 – 49 | 32 – 40 |
| Hot wire ignition (sec.) | UL specification | A | 300+ | 300+ |
| High voltage arc resistance (sec.) | UL specification | A | 120+ | 120+ |
| Flexural strength (kg.mm²) | JIS K-6911 (1970) | A | 18.8 | 18.2 |

Table 2-continued

| Test item | Standards | Treating conditions | A | B |
|---|---|---|---|---|
| Test item | Standards | Treating conditions | G | H |
| Water absorption (%) | JIS K-6911 (1970) | E-24/50 + D-24/23 | 0.58 | 0.78 |
| Insulation resistance (Ω) | JIS K-6911 (1970) | C-90/20/65 | $9.6 \times 10^{12}$ | $1.6 \times 10^{12}$ |
| | | C-90/20/65 + D-2/100 | $5.6 \times 10^{8}$ | $2.1 \times 10^{8}$ |
| Punchability | ASTM D-617 | A | 30 – 80°C Excellent | 30 – 80°C Fair |
| Flame resistance | UL specification | Solid burning class | 94 V-0 | 94 V-0 |
| Solder float 260°C (sec.) | National Electric Manufactures Association | A | 38 – 42 | 32 – 34 |
| Hot wire ignition (sec.) | UL specification | A | 300+ | 300+ |
| High voltage arc resistance (sec.) | UL specification | A | 120+ | 120+ |
| Flexural strength (kg.mm²) | JIS K-6911 (1970) | A | 19.8 | 17.6 |

| Test item | Standards | Treating conditions | I | J |
|---|---|---|---|---|
| Water absorption (%) | JIS K-6911 (1970) | E-24/50 + D-24/23 | 0.63 | 0.81 |
| Insulation resistance (Ω) | JIS K-6911 (1970) | C-90/20/65 | $3.4 \times 10^{12}$ | $1.1 \times 10^{12}$ |
| | | C-90/20/65 + D-2/100 | $2.5 \times 10^{8}$ | $9.7 \times 10^{7}$ |
| Punchability | ASTM D-617 | A | 30 – 80°C Very good | 30 – 80°C Very good |
| Flame resistance | UL specification | Solid burning class | 94 V-0 | 94 V-0 |
| Solder float 260°C (sec.) | National Electric Manufactures Association | A | 48 – 50 | 28 – 30 |
| Hot wire ignition (sec.) | UL specification | A | 300+ | 300+ |
| High voltage arc resistance (sec.) | UL specification | A | 120+ | 120+ |
| Flexural strength (kg.mm²) | JIS K-6911 (1970) | A | 18.2 | 16.8 |

| Test item | Standards | Treating conditions | K | L |
|---|---|---|---|---|
| Water absorption (%) | JIS K-6911 (1970) | E-24/50 + D-24/23 | 0.61 | 0.59 |
| Insulation resistance (Ω) | JIS K-6911 (1970) | C-90/20/65 | $7.6 \times 10^{12}$ | $8.3 \times 10^{12}$ |
| | | C-90/20/65 + D-2/100 | $5.8 \times 10^{8}$ | $6.4 \times 10^{8}$ |
| Punchability | ASTM D-617 | A | 40 – 80°C Good | 30 – 80°C Very good |
| Flame resistance | UL specification | Solid burning class | 94 V-0 | 94 V-0 |
| Solder float 260°C (sec.) | National Electric Manufactures Association | A | 35 – 37 | 40 – 45 |
| Hot wire ignition (sec.) | UL specification | A | 300+ | 300+ |
| High voltage arc resistance (sec.) | UL specification | A | 120+ | 120+ |
| Flexural strength (kg.mm²) | JIS K-6911 (1970) | A | 17.2 | 18.4 |

| Test item | Standards | Treating conditions | M | N |
|---|---|---|---|---|
| Water absorption (%) | JIS K-6911 (1970) | E-24/50 + D-24/23 | 0.83 | 0.58 |
| Insulation resistance (Ω) | JIS K-6911 (1970) | C-90/20/65 | $1.4 \times 10^{12}$ | $4.2 \times 10^{13}$ |
| | | C-90/20/65 + D-2/100 | $8.2 \times 10^{7}$ | $9.6 \times 10^{8}$ |
| Punchability | ASTM D-617 | A | 30 – 80°C Fair | 30 – 80°C Excellent |
| Flame resistance | UL specification | Solid burning class | 94 V-0 | 94 V-0 |
| Solder float 260°C (sec.) | National Electric Manufactures Association | A | 24 – 27 | 48 – 50 |
| Hot wire ignition (sec.) | UL specification | A | 300+ | 300+ |
| High voltage arc resistance (sec.) | UL specification | A | 120+ | 120+ |
| Flexural strength (kg.mm²) | JIS K-6911 (1970) | A | 17.1 | 19.8 |

| Test item | Standards | Treating conditions | O | P |
|---|---|---|---|---|
| Water absorption (%) | JIS K-6911 (1970) | E-24/50 + D-24/23 | 0.61 | 0.68 |
| Insulation resistance (Ω) | JIS K-6911 (1970) | C-90/20/65 | $2.4 \times 10^{13}$ | $1.1 \times 10^{13}$ |
| | | C-90/20/65 + D-2/100 | $6.2 \times 10^{8}$ | $6.8 \times 10^{8}$ |
| Punchability | ASTM D-617 | A | 30 – 80°C Very good | 30 – 80°C Very good |
| Flame resistance | UL specification | Solid burning class | 94 V-0 | 94 V-0 |
| Solder float 260°C (sec.) | National Electric Manufactures Association | A | 32 – 36 | 42 – 44 |
| Hot wire ignition (sec.) | UL specification | A | 300+ | 300+ |
| High voltage arc resistance (sec.) | UL specification | A | 120+ | 120+ |
| Flexural strength (kg.mm²) | JIS K-6911 (1970) | A | 17.6 | 18.2 |

Note:
1) The temperature in the "Punchability" column refers to the optimum temperature at which the laminate is punched.
2) Hot wire ignition >15 sec.
3) High voltage arc resistance >120 sec.
4) In the "Treating Conditions" column, A: as received, C: treated in air at constant temp. and humidity, D: soaked in distilled Table 2-continued

| Test item | Standards | Treating conditions | A | B |
|---|---|---|---|---| water and E: treated in air at constant temp. The first figure refers to treating time (hr.), the second figure to treating temp. (°C), and the third figure to relative humidity (%).
5) "+" refers to OK even at figures larger than shown though not measured.

What is claimed is:

1. A resin composition for laminates which comprises a drying oil-modified resol phenolic resin and a resol water-soluble phenolic resin, characterized in that the composition additionally contains at least one amine-modified resol phenolic resin and at least one halogenated epoxy-drying oil-modified resol phenolic resin, and the proportion of the amine-modified resol phenolic resin is 20 to 60 % by weight, the proportion of the halogenated epoxy-drying oil-modified resol phenolic resin is 10 to 60 % by weight, the proportion of the drying oil-modified resol phenolic resin is 15 to 55 % by weight, and the proportion of the resol water-soluble phenolic resin is 5 to 20 % by weight, based on the weight of the whole composition.

2. A composition according to claim 1, wherein the at least one amine-modified resol phenolic resin is selected from the group consisting of melamine-modified resol phenol resin, benzoguanamine-modified resol phenol resin, methylguanamine-modified resol phenol resin, benzenesulfonamide-modified resol phenol resin, melamine-benzenesulfonamide-modified resol phenol resin and melamine-toluenesulfonamide-modified resol phenol resin.

3. A composition according to claim 1, wherein the at least one halogenated epoxy-drying oil-modified resol phenolic resin is selected from the group consisting of dibromocresyl glycidyl ether-tung oil-modified resol phenol resin, dibromophenyl glycidyl ether-tung oil-modified resol phenol resin, dibromocresyl glycidyl ether-linseed oil-modified resol phenol resin, dibromocresyl clycidyl ether-tung oil-modified resol alkylphenol resin, and dibromocresyl glycidyl ether-linseed oil-modified resol alkylphenol resin.

4. A composition according to claim 1, wherein the drying oil-modified resol phenolic resin is a tung oil-modified resol phenol resin.

5. A composition according to claim 1, wherein the proportion of the amine-modified resol phenolic resin is 20 to 50 % by weight.

6. A composition according to claim 1, wherein the proportion of the halogenated epoxy-drying oil-nodified resol phenolic resin is 15 to 50 % by weight.

7. A composition according to claim 1, wherein the proportion of the drying oil-modified resol phenolic resin is 20 to 40 % by weight.

8. A composition according to claim 1, wherein the proportion of the resol water-soluble phenolic resin is 7 to 15 % by weight.

9. A composition according to claim 1, wherein the composition additionally contains at least one flame retardant selected from the group consisting of halogenated phenols, halogenated epoxy resins, phosphorous esters and phosphates.

10. A composition according to claim 9, wherein the halogenated phenol is at least one member selected from the group consisting of monobromophenol, dibromophenol, tribromophenol, trichlorophenol, 2,2-bis(4-hydroxy-tetrabromophenyl)propane and 2,2-bis(4-hydroxy-tetrachlorophenyl)propane.

11. A composition according to claim 9, wherein the phosphorous ester is at least one member selected from the group consisting of tributyl phosphite, tridecyl phosphite, triphenyl phosphite and tricresyl phosphite.

12. A composition according to claim 9, wherein the phosphate is at least one member selected from the group consisting of tributyl phosphate, trioleyl phosphate, dioctyl phosphate, tricresyl phosphate and tris(2,3-dibromopropyl) phosphate.

* * * * *